US009301178B2

(12) United States Patent
Nakajima et al.

(10) Patent No.: US 9,301,178 B2
(45) Date of Patent: Mar. 29, 2016

(54) DATA EXTRACTION METHOD AND DATA EXTRACTION DEVICE

(71) Applicant: FUJITSU LIMITED, Kawasaki-shi, Kanagawa (JP)

(72) Inventors: Hisaaki Nakajima, Yokohama (JP); Norishige Ichihashi, Yokohama (JP); Tomohisa Satou, Yokohama (JP); Kazuyoshi Ichimura, Yokohama (JP); Hironobu Kurumazaki, Yokosuka (JP)

(73) Assignee: Fujitsu Limited, Kawasaki (JP)

( * ) Notice: Subject to any disclaimer, the term of this patent is extended or adjusted under 35 U.S.C. 154(b) by 180 days.

(21) Appl. No.: 14/229,729

(22) Filed: Mar. 28, 2014

(65) Prior Publication Data

US 2014/0323164 A1    Oct. 30, 2014

(30) Foreign Application Priority Data

Apr. 25, 2013  (JP) ................................ 2013-092984

(51) Int. Cl.
*H04W 24/08* (2009.01)
*H04L 29/06* (2006.01)
*G06F 12/08* (2006.01)

(52) U.S. Cl.
CPC ............. *H04W 24/08* (2013.01); *G06F 12/08* (2013.01); *H04L 65/607* (2013.01)

(58) Field of Classification Search
CPC ....... H04W 24/08; G06F 12/08; H04L 65/607
See application file for complete search history.

(56) References Cited

U.S. PATENT DOCUMENTS

| 6,145,064 A | 11/2000 | Long et al. |
| 2006/0173925 A1 | 8/2006 | Ogawa |
| 2006/0227754 A1* | 10/2006 | Ko ........................ H04W 24/08 370/338 |

FOREIGN PATENT DOCUMENTS

| JP | 07-152653 A | 6/1995 |
| JP | 10-133950 A | 5/1998 |
| JP | 2006-350633 A | 12/2006 |
| JP | 2007-087177 A | 4/2007 |
| JP | 2008-135051 A | 6/2008 |

* cited by examiner

*Primary Examiner* — Barry Taylor
(74) *Attorney, Agent, or Firm* — Arent Fox LLP

(57) ABSTRACT

A data extraction method includes: obtaining a log in which control messages for a plurality of calls are mixed; and executing, by a processor, in parallel a plurality of extraction processes each extracting a control message for a different call to be extracted from the log. The plurality of extraction processes each includes: a first process that includes: determining whether a candidate message that satisfies a certain condition based on the call among the control messages is a paging message; and storing order information for specifying an order of the call among the plurality of calls, when determined that the candidate message is a paging message; and a second process that includes: determining, after the first process on the plurality of extraction processes has been completed, whether the candidate message determined to be the paging message is the control message of the call, based on the order information.

15 Claims, 18 Drawing Sheets

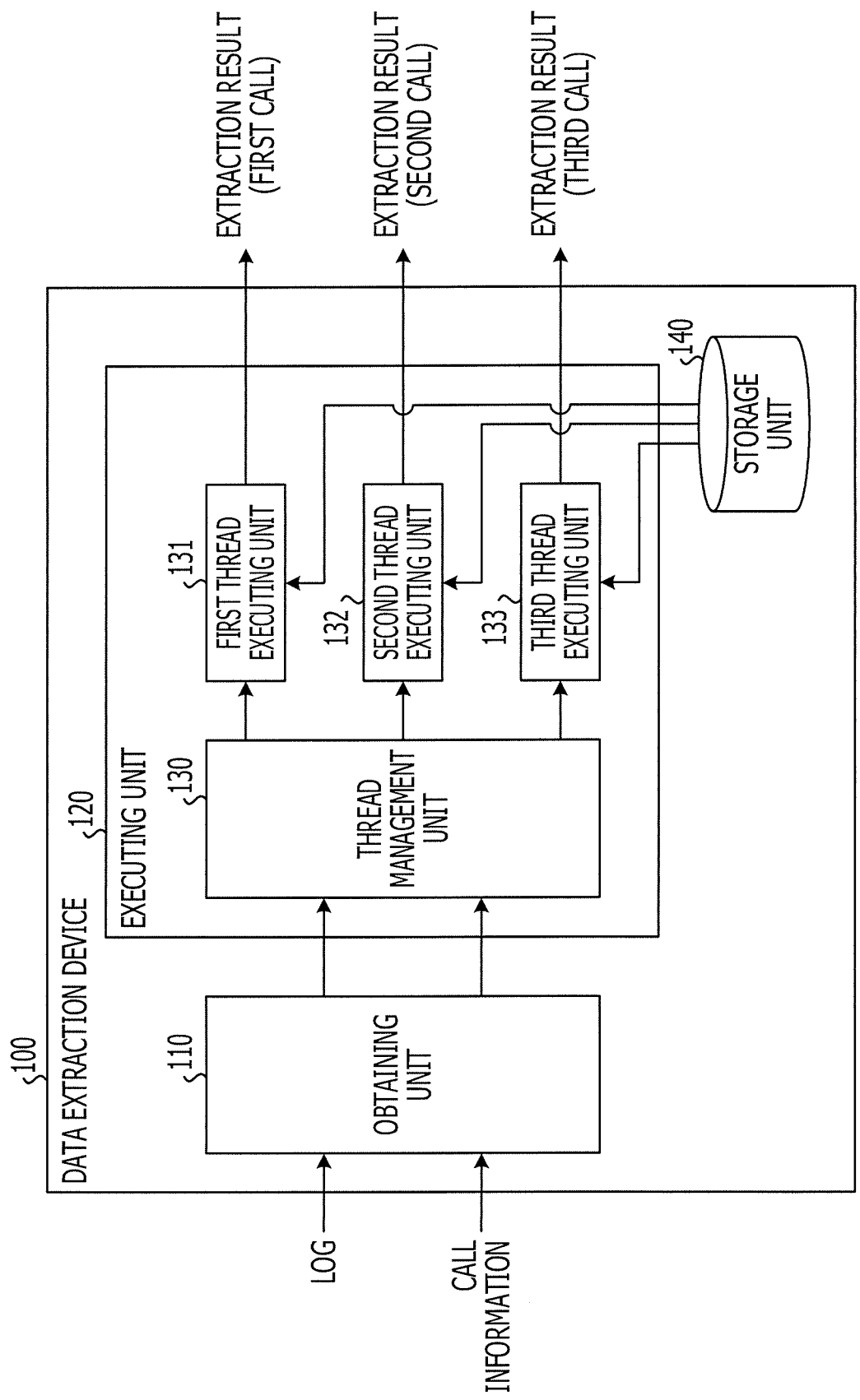

FIG. 3B

| MESSAGE | | TMSI | PARA1 | PARA2 | PARA3 |
|---|---|---|---|---|---|
| 1 | RRC:RRC CONNECTION REQUEST | 10 | 5 | - | - |
| 2 | NBAP:RADIO LINK SETUP REQUEST | - | 5 | 20 | - |
| 3 | RRC:PAGING TYPE 1 | 100 | - | - | - |
| 4 | RRC:RRC CONNECTION REQUEST | 100 | 200 | - | - |
| 5 | NBAP:RADIO LINK SETUP RESPONSE | - | - | 20 | - |
| 6 | RRC:RRC CONNECTION SETUP | 10 | - | - | 30 |
| 7 | NBAP:RADIO LINK SETUP REQUEST | - | - | - | - |
| 8 | RRC:RRC CONNECTION SETUP COMPLETE | - | - | - | 30 |
| .. | | | | | |

300

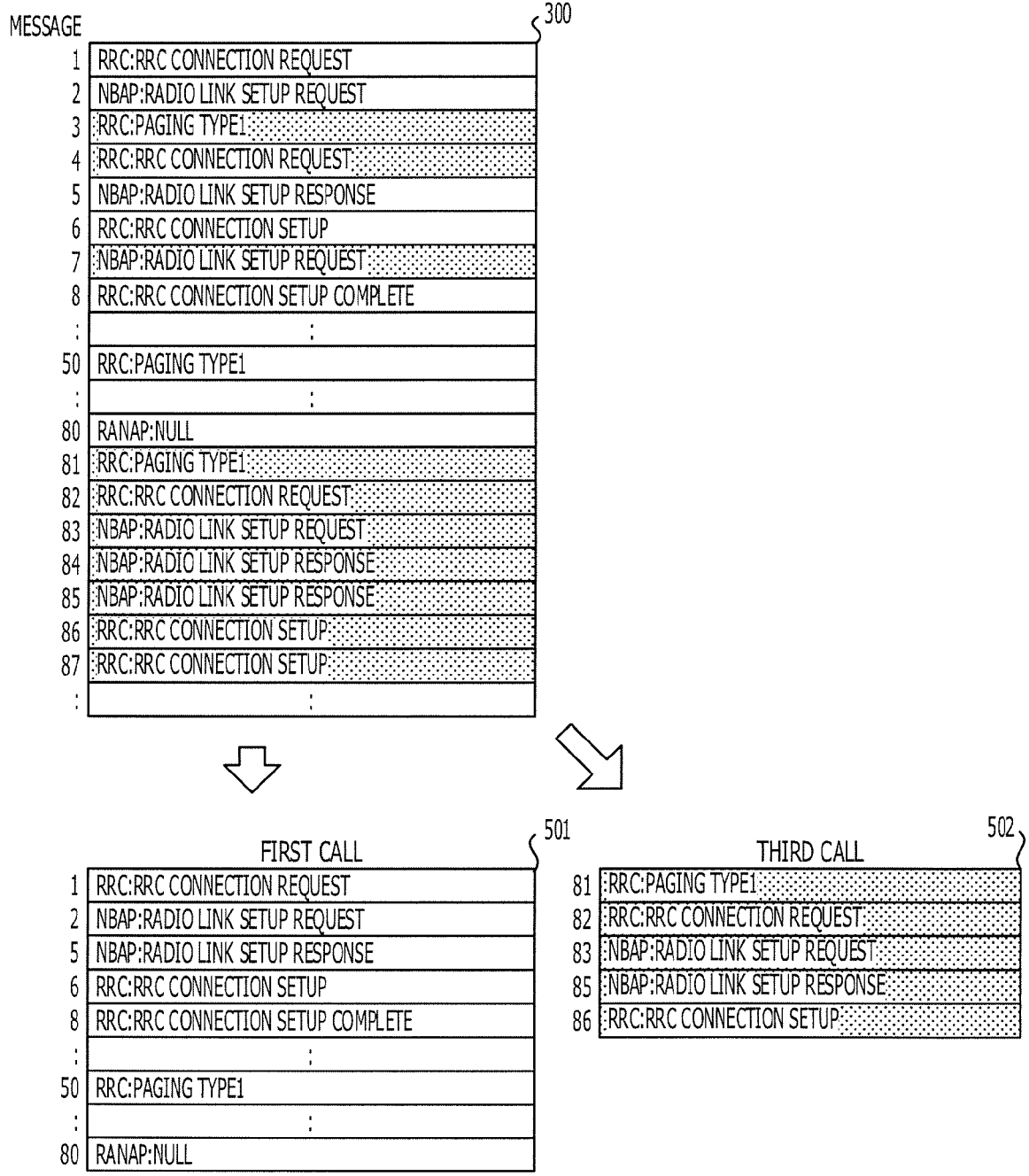

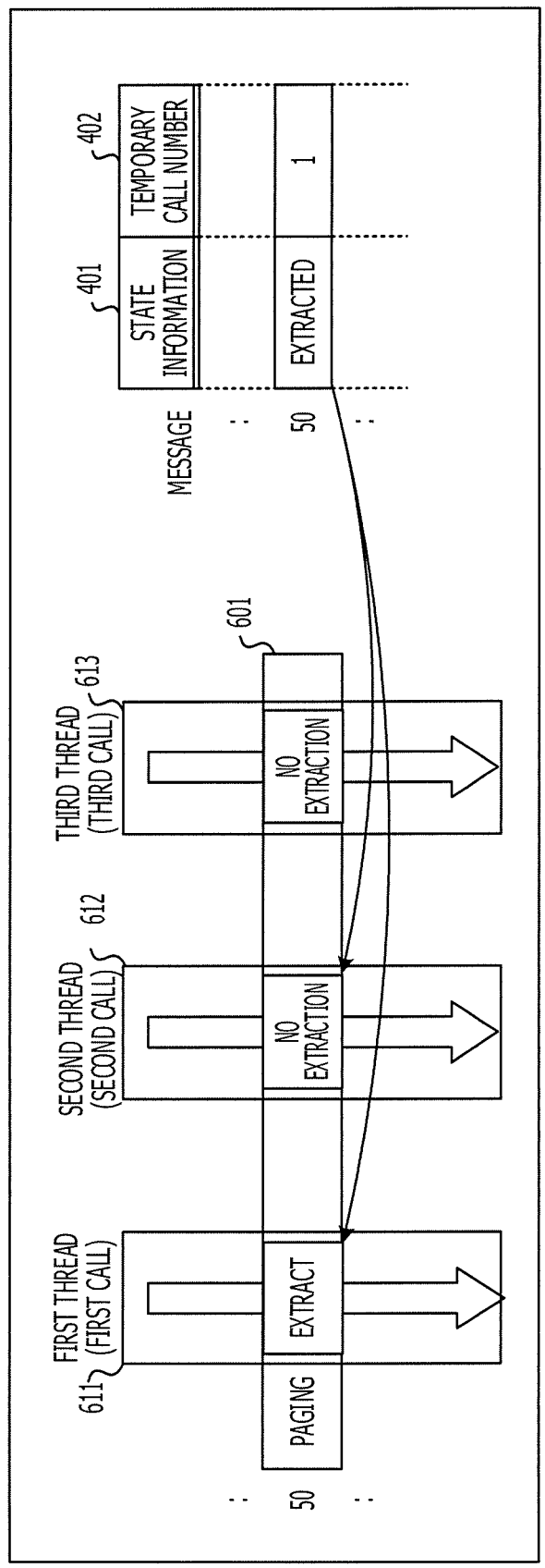

DATA EXTRACTION METHOD AND DATA EXTRACTION DEVICE

CROSS-REFERENCE TO RELATED APPLICATION

This application is based upon and claims the benefit of priority from the prior Japanese Patent Application No. 2013-092984 filed on Apr. 25, 2013, the entire contents of which are incorporated herein by reference.

FIELD

The embodiments discussed herein relate to a data extraction method, and a data extraction device.

BACKGROUND

Japanese Laid-open Patent Publication No. 2006-350633 discusses a data management method in which data in an external storage device is controlled by holding the data in a cache in the main storage device.

Moreover, call control messages flowing between wireless network control stations and base stations are stored as logs in a mobile communication network. A technique is known for extracting certain call control messages from the messages included in the stored log for use in, for example, damage analysis or call loss studies.

SUMMARY

According to an aspect of the invention, a data extraction method, includes: obtaining a log in which control messages for a plurality of calls are mixed; and executing, by a processor, in parallel a plurality of extraction processes each extracting a control message for a different call to be extracted from the log. The plurality of extraction processes each includes: a first process that includes: determining whether a candidate message that satisfies a certain condition based on the call to be extracted among the control messages is a paging message; and storing order information for specifying an order of the call to be extracted among the plurality of calls, when determined that the candidate message is a paging message; and a second process that includes: determining, after the first process on the plurality of extraction processes has been completed, whether the candidate message determined to be the paging message is the control message of the call to be extracted, based on the order information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1B illustrates an example of the flow of information in the data extraction device illustrated in FIG. 1A;
FIG. 3B illustrates an example of parameters included in a message;
FIG. 5 illustrates an example of an extraction result from a log;
FIG. 6F illustrates a sixth example of a process by an executing unit.

DESCRIPTION OF EMBODIMENT

Hereinafter, embodiments of a data extraction method, a data extraction program, a data extraction device, and a computer-readable recording medium storing a data extraction program will be discussed in detail with reference to the drawings.

While inventing the present embodiments, observations were made regarding a related art. Such observations include the following, for example.

In a mobile communication network or the related art there is a problem in that a process to extract each of a plurality of call control messages from the log desires a certain amount of time in order for a large amount of the call control messages to be stored in the abovementioned conventional technique.

Therefore, the embodiments disclosed herein, for example, provide techniques for reducing the time desired for the processing to extract a plurality of call control messages from a log.

(Data Extraction Device According to the Embodiment)

Figure 1A:
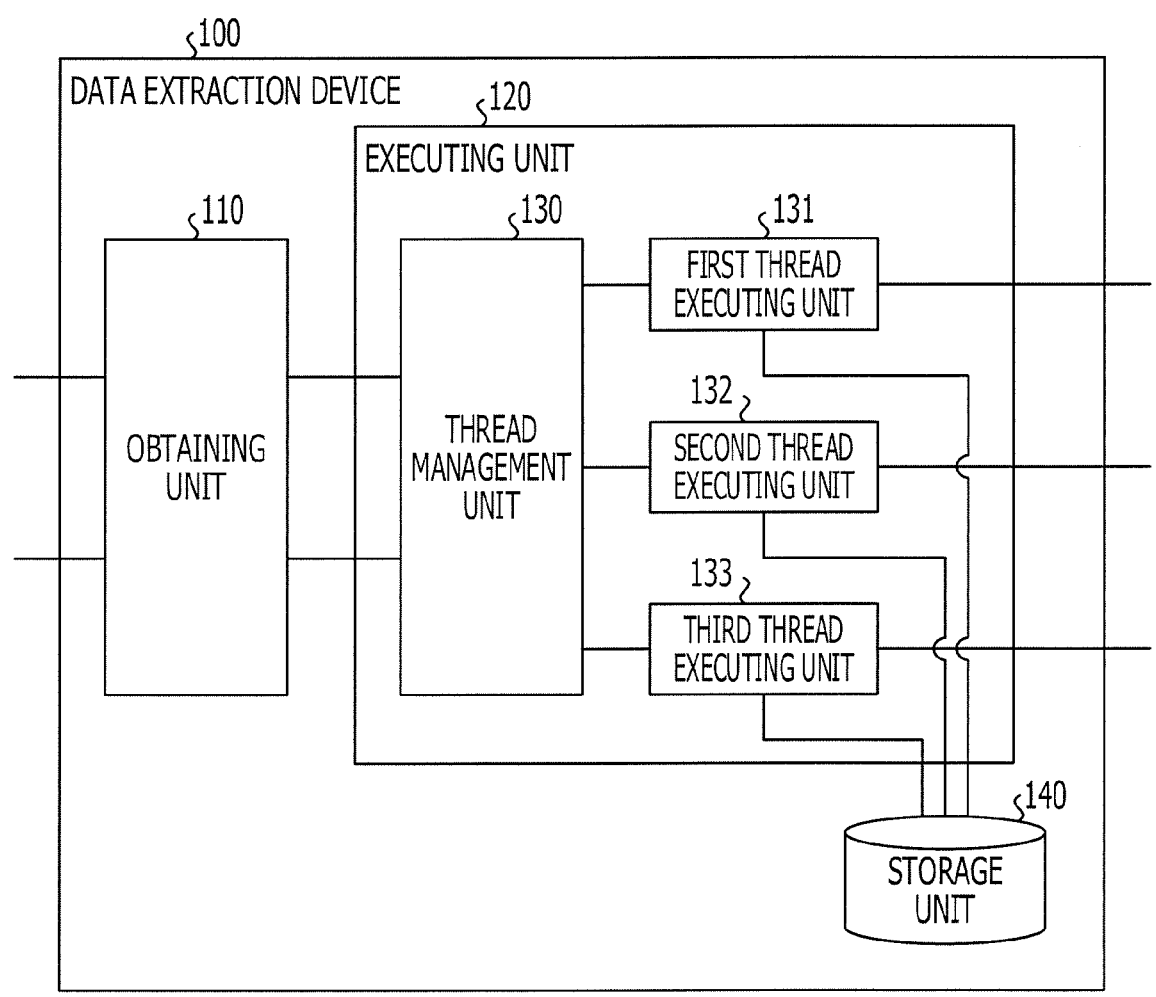
FIG. 1A illustrates an example of a data extraction device according to an embodiment.

FIG. 1A illustrates an example of a data extraction device according to an embodiment. FIG. 1B illustrates an example of a flow of information in the data extraction device illustrated in FIG. 1A. As illustrated in FIGS. 1A and 1B, a data extraction device 100 according to the embodiment is provided with an obtaining unit 110, an executing unit 120, and a storage unit 140.

The obtaining unit 110 obtains a log of control messages (hereinbelow simply referred to as "message") of calls (calls of mobile communication terminals). The log obtained by the obtaining unit 110 is a log in which a plurality of call messages are mixed together. For example, a log obtained by the obtaining unit 110 is a log of call control messages that pass through a specific communication device in a mobile communication network. The obtaining unit 110 outputs the obtained log to the executing unit 120.

Moreover, the obtaining unit 110 obtains call information relating to a plurality of calls to be extracted by the data extraction device 100. In the example illustrated in FIGS. 1A and 1B, the calls to be extracted by the data extraction device 100 include a first call, a second call, and a third call. A terminal being called may be included in the same plurality of calls as the first call, the second call, and the third call.

The call information includes identification information (e.g., a call number) for identifying, for example, the first call, the second call, and the third call, and identification information of the terminal to be called with each of the first call, the second call, and the third call. The terminal identification information is, for example, a temporary mobile subscriber identity (TMSI). The obtaining unit 110 outputs the obtained call information to the executing unit 120.

The executing unit 120 executes a plurality of extraction processes in parallel. The plurality of extraction processes includes extracting different messages of calls to be extracted from the log output by the obtaining unit 110. The plurality of processes is, for example, a plurality of threads.

In the example illustrated in FIGS. 1A and 1B, the executing unit 120 is provided with a thread management unit 130, a first thread executing unit 131, a second thread executing unit 132, and a third thread executing unit 133. However, the number of thread executing units may be changed according to the number of calls to be extracted from which messages are extracted at the same time by the data extraction device 100.

The thread management unit 130 generates a plurality of threads corresponding to each of the plurality of calls to be extracted based on the call information output by the obtaining unit 110. In the example illustrated in FIGS. 1A and 1B, the thread management unit 130 generates a first thread, a second thread, and a third thread respectively corresponding to the first call, the second call, and the third call to be extracted.

The first thread executing unit 131, the second thread executing unit 132, and the third thread executing unit 133 respectively execute the first thread, the second thread, and the third thread generated by the thread management unit 130. As a result, the extraction processes conducted on the first call, the second call, and the third call may be executed in parallel by multi-threading.

The storage unit 140 is a storage unit that is commonly accessible to the first thread, the second thread, and the third thread executed respectively by the first thread executing unit 131, the second thread executing unit 132, and the third thread executing unit 133.

The first thread, the second thread, and the third thread executed respectively by the first thread executing unit 131, the second thread executing unit 132, and the third thread executing unit 133 each include a first process and a second process as described below.

(First Process)

The following is an explanation of the first process included in each thread. For example, the first thread executing unit 131 firstly determines, as the first process, whether a message that satisfies a certain condition based on the first call to be extracted among the messages included in the log output by the obtaining unit 110, is a candidate message that becomes a candidate of a message to be extracted. The certain condition based on a call is the inclusion of the identification information (e.g., TMSI) of a terminal being called by the call, or the inclusion of the same parameter in a message that has been determined to satisfy the certain condition based on the call.

Next, the first thread executing unit 131 determines whether there is a candidate message that is a paging message among the candidate messages. If it is determined that none of the candidate messages is a paging message, the first thread executing unit 131 determines that the applicable candidate message is a message of the first call. The first thread executing unit 131 then adds the applicable to candidate message to the extraction result of the message of the first call.

If it is determined that the candidate message is a paging message, the first thread executing unit 131 defers the determination as to whether the applicable candidate message is the message of the first call. The first thread executing unit 131 then stores order information that is able to specify the order of the first call among the calls included in the log, in the storage unit 140 in association with the applicable candidate message.

For example, the first call is the call that was started first, the second call is the call that was started second, and the third call is the call that was started third among the first call, the second call, and the third call. The numbers of the first call, the second call, and the third call (call numbers) are respectively designated as "1," "2," and "3." In this case, the order information that is able to specify the order of the calls is, for example, a call number. Therefore, the first thread executing unit 131 stores the call number "1" of the first call in the storage unit 140 in association with the applicable candidate message when it is determined that the candidate message is a paging message.

The second thread executing unit 132 and the third thread executing unit 133 both conduct the first process in the same way as the first thread executing unit 131 on the respective calls to be extracted that are the second call and the third call.

(Second Process)

When the first process has been completed by the first thread executing unit 131, the second thread executing unit 132, and the third thread executing unit 133, the first thread executing unit 131, the second thread executing unit 132, and the third thread executing unit 133 conduct the following second process.

For example, the first thread executing unit 131 obtains the order information of a candidate message determined to be a paging message and stored in the storage unit 140 by at least any one of the first thread, the second thread, and the third thread. The first thread executing unit 131 then executes the second process to determine whether the candidate message determined to be a paging message is a message of the first call to be extracted based on the obtained order information.

If order information indicating an order earlier than the order information of the first call to be extracted is not stored in the storage unit 140, it may be determined that a call earlier than the first call and that is a candidate for extraction before the candidate message determined to be a paging message, is not present. In this case, the first thread executing unit 131 determines that the candidate message determined to be a paging message is a control message of the first call to be extracted. The first thread executing unit 131 then adds the applicable to candidate message to the extraction result of the message of the first call.

Conversely, if order information indicating an order earlier than the order information of the first call to be extracted is stored in the storage unit 140, it may be determined that a call earlier than the first call and that is a candidate for extraction before the candidate message determined to be a paging message, is present. In this case, the first thread executing unit 131 determines that the candidate message determined to be a paging message is not a control message of the first call to be extracted. The first thread executing unit 131 then does not add the applicable candidate message to the extraction result of the message of the first call.

The second thread executing unit 132 and the third thread executing unit 133 similarly execute the second process to determine whether the candidate message determined to be a paging message is a message of a call to be extracted based on the obtained order information stored in the storage unit 140.

(Output of Extraction Result)

The first thread executing unit 131 outputs the extraction result of the message of the first call to be extracted. The second thread executing unit 132 outputs the extraction result of the message of the second call to be extracted. The third thread executing unit 133 outputs the extraction result of the message of the third call to be extracted.

In this way, the time desired for extraction may be shortened by multi-threading the extraction of the messages of each call from the log of the call control. Further, the extraction of paging messages in each thread may be deferred and an extraction priority may be determined based on the order of the calls. As a result, the extraction of messages from each call may be conducted more accurately even during multi-threading that does not ensure a processing order between the threads.

While exclusive processing may be considered to ensure the order between threads, the processing speed may be reduced due to waiting times for exclusive resources during exclusive processing. Conversely, according to the data extraction device 100, such a reduction in processing speed may be avoided since the extraction of messages from each call may be conducted more accurately without the use of exclusive processing.

(Hardware Configuration of Data Extraction Device)

Figure 2:
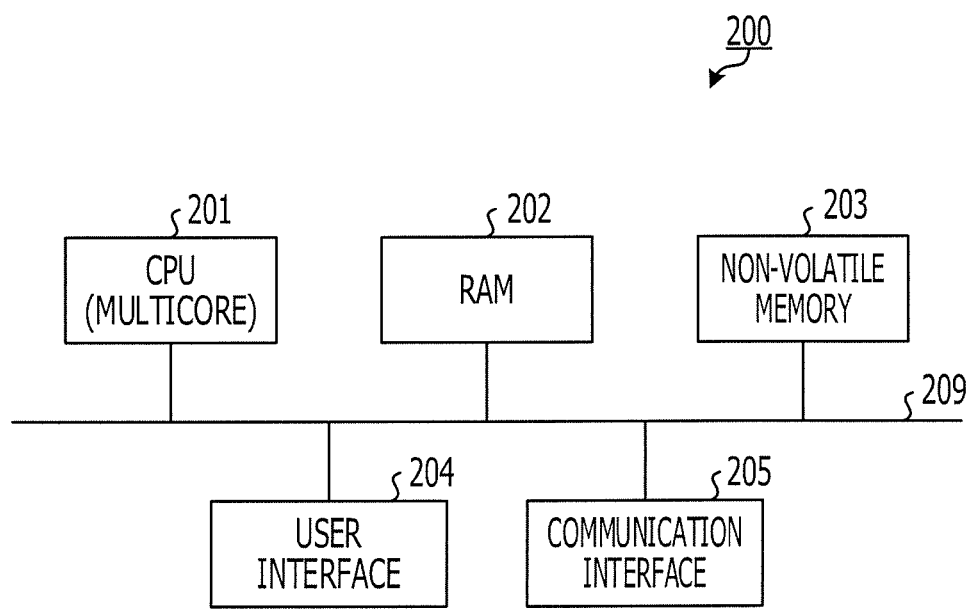
FIG. 2 illustrates a hardware configuration of the data extraction device.

FIG. 2 illustrates a hardware configuration of the data extraction device. The data extraction device 100 illustrated in FIGS. 1A and 1B may be realized, for example, by an information processor apparatus 200 illustrated in FIG. 2. The information processor apparatus 200 is provided with a CPU 201, a RAM 202, a non-volatile memory 203, a user interface 204, and a communication interface 205. The CPU 201, the RAM 202, the non-volatile memory 203, the user interface 204, and the communication interface 205 are connected by a bus 209.

The central processing unit (CPU) 201 controls the entire information processor apparatus 200. The CPU 201 is, for example, a multi-core processor having a plurality of cores. As a result, the time desired for processing with multi-threading may be reduced.

The random access memory (RAM) 202 is used as a work area by the CPU 201. The non-volatile memory 203 is, for example, a non-volatile memory such as a magnetic disc, an optical disk, or a flash memory and the like. Various type of programs operated by the information processor apparatus 200 are stored in the non-volatile memory 203. The programs stored in the non-volatile memory 203 are loaded into the RAM 202 and executed by the CPU 201.

The user interface 204 includes, for example, an input device for receiving operation inputs from a user and an output device for outputting information to the user. The input device may be realized by, for example, keys (such as a keyboard) or a remote controller and the like. The output device may be realized by, for example, a display and/or a speaker. Moreover, the input device and the output device may be realized by a touch panel and the like. The user interface 204 is controlled by the CPU 201.

The communication interface 205 is a communication interface that conducts, for example, wireless or wired communication with devices outside of the information processor apparatus 200. The communication interface 205 is controlled by the CPU 201.

The obtaining unit 110 illustrated in FIGS. 1A and 1B may be realized, for example, by the user interface 204 or the communication interface 205. The executing unit 120 illustrated in FIGS. 1A and 1B may be realized, for example, by the CPU 201 and the RAM 202. The storage unit 140 illustrated in FIGS. 1A and 1B may be realized, for example, by the RAM 202 or the non-volatile memory 203.

(Log Example)

Figure 3A:
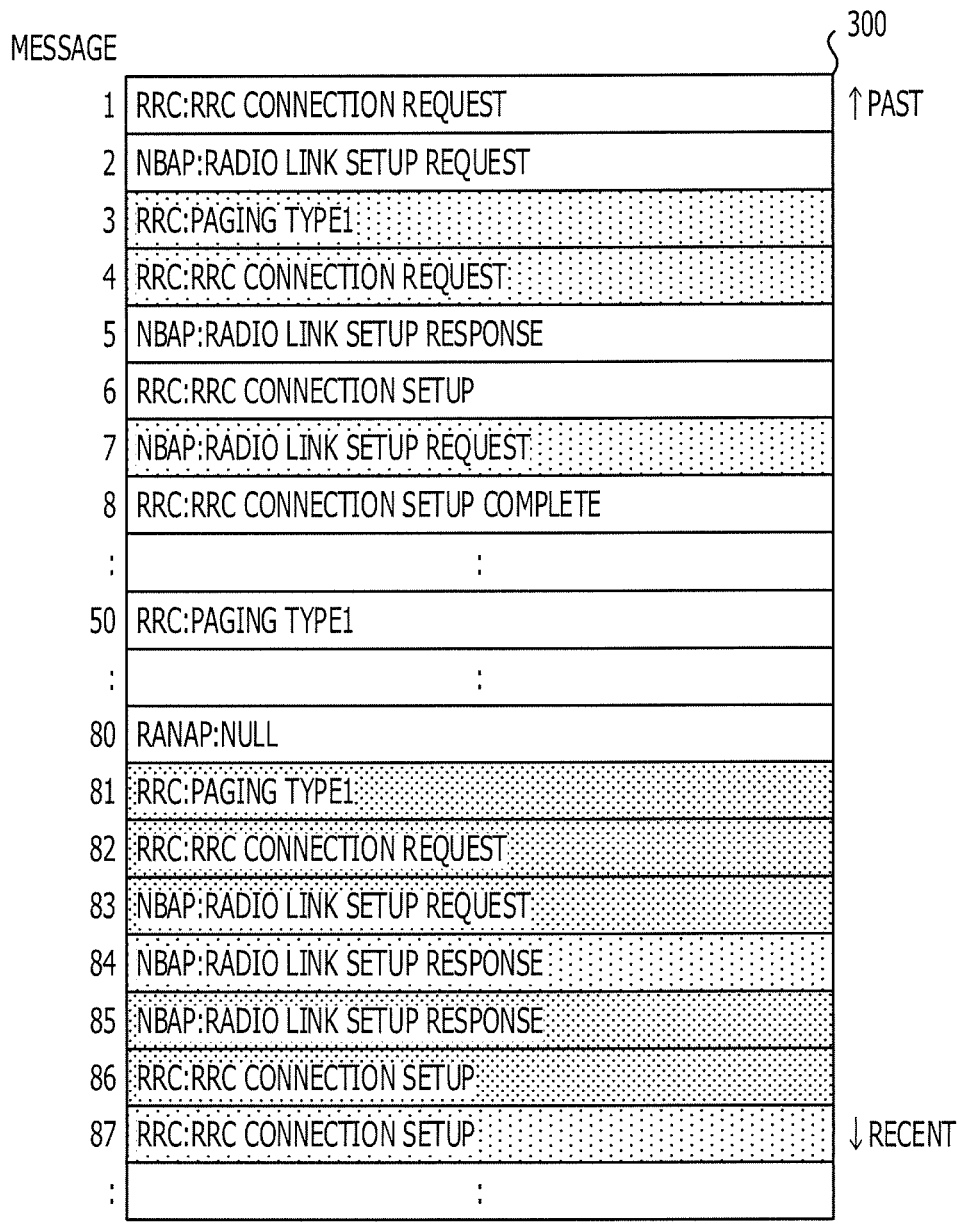
FIG. 3A illustrates an example of a log.

FIG. 3A illustrates an example of a log. The obtaining unit 110 of the data extraction device 100 obtains, for example, a log 300 illustrated in FIG. 3A. The log 300 is an example of a log of messages in, for example, a radio network controller (RNC) in a mobile communication network.

Messages of the first call, the second call, and the third call are stored in a time sequence in the log 300. Since the first call, the second call and the third call occur while being overlapped in a temporal manner, the messages of the calls are stored in a disordered state in the log 300. The numbers "1," "2," . . . "50," . . . "87" in the log 300 represent sequence numbers of the messages. The smaller numbers among the sequence numbers in the example illustrated in FIG. 3A indicate correspondingly older messages.

Moreover, the first call and the third call are both calls from a first terminal in the example illustrated in FIG. 3A. The second call is a call from a second terminal that is different from the first terminal. For example, when incoming calls to the same terminal occur a plurality of times with the same RNC, the plurality of call messages to the same terminal may be stored in the log 300 in this way.

Each message has a parameter that is unique for each call unit, and the messages for each call may be extracted from the log 300 by association of parameters with the same values. Since a message is exchanged with only one call, a message does not belong to a plurality of calls. As a result, a message extracted as a message of a certain call is excluded from being extracted as a message from another call.

The message "RANAP:PAGING" and the message "RRC: PAGING TYPE 1" included in the log 300 are paging (calling action when a call is received at a mobile terminal) messages.

The same TMSI (first terminal) is included in a paging message of the first call and a paging message of the third call since the first call and the third call are calls from the same terminal (first terminal). As a result, when extraction is conducted due to the consistency of the parameters in each thread, the paging message (50) of the first call may be extracted as a message of the third call.

For example, when the third thread for extracting a message of the third call refers to the message (50) before the first thread for extracting a message of the first call, the message (50) is extracted as a message of the third call and is designated as "extracted." As a result, the paging message (50) of the first call is not extracted as a thread of the first call when the first thread later refers to the message (50).

In contrast, since the paging message is extracted as a message of the call with the lowest number according to the data extraction device 100, the call message that occurs first among the first call, the second call, and the third call may be extracted (see, for example, FIG. 5). As a result, regardless of the ordering of the thread processes, a call may be extracted as a unique call even for messages for pagings exchanged asynchronously.

(Parameters Included in Message)

FIG. 3B illustrates an example of parameters included in a message. The messages included in the log 300 include parameters as illustrated for example in FIG. 3B. For example, the TMSI of a terminal being called is included in the "RRC: RRC CONNECTION REQUEST" and the "RRC: RRC CONNECTION SETUP" in the initial stage of a call control.

Moreover, the TMSI of a terminal being called is included in the "RANAP:PAGING" and the "RRC:PAGING TYPE 1" that are paging messages. Parameters such as para1, para2, and para3 are included in the messages. Para1, para2, and para3 are temporary names of parameters.

(Information Stored in Storage Unit)

Figure 4:
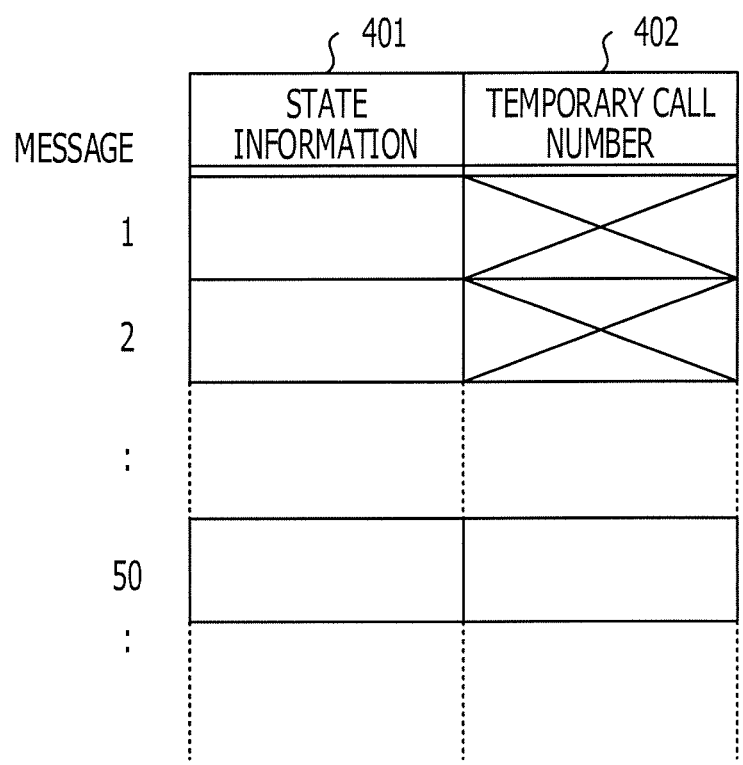
FIG. 4 illustrates an example of information stored in a storage unit.

FIG. 4 illustrates an example of information stored in the storage unit. The message numbers "1," "2," . . . "50," in the log 300 in FIG. 4 represent sequence numbers of the messages included in the log 300 in FIG. 3A. State information 401 associated with each of the messages in the log 300 is stored, for example, in the storage unit 140.

The state information 401 associated with the paging message (50) is set to be either "unregistered" or "extracted." The state information 401 associated with the other paging messages is set to be any of "unregistered," "deferred," and "extracted." The initial value of the state information 401 is "unregistered."

A temporary call number 402 associated with each of the paging messages (e.g., message (50)) in the log 300 is stored in the storage unit 140.

(Log Extraction Result)

FIG. 5 illustrates an example of an extraction result from a log. An extraction result 501 illustrated in FIG. 5 illustrates a result of messages of the first call extracted from the log 300 by the first thread executing unit 131. An extraction result 502 illustrates a result of messages of the third call extracted from the log 300 by the third thread executing unit 133.

According to the data extraction device 100, the extraction of the paging message (50) of the first call is deferred in the first thread and the third thread and then may be extracted later as a first call message by the first thread based on the order of the calls.

(Processing by Executing Unit)

FIGS. 6A to 6G illustrate an example of processing by the executing units. In FIGS. 6A to 6G, a first thread 611 is executed by the first thread executing unit 131 and is an extraction process for extracting messages of the first call from the log 300. A second thread 612 is executed by the second thread executing unit 132 and is an extraction process for extracting messages of the second call from the log 300. A third thread 613 is executed by the third thread executing unit 133 and is an extraction process for extracting messages of the third call from the log 300.

In the examples illustrated in FIGS. 6A to 6G, the first call, the second call, and the third call are assumed to be calls to the same terminal. A paging message 601 is a paging message of the first call included in the log 300. Therefore, the TMSI of the common terminal being called by the first call, the second call, and the third call is included in the paging message 601.

Figure 6A:
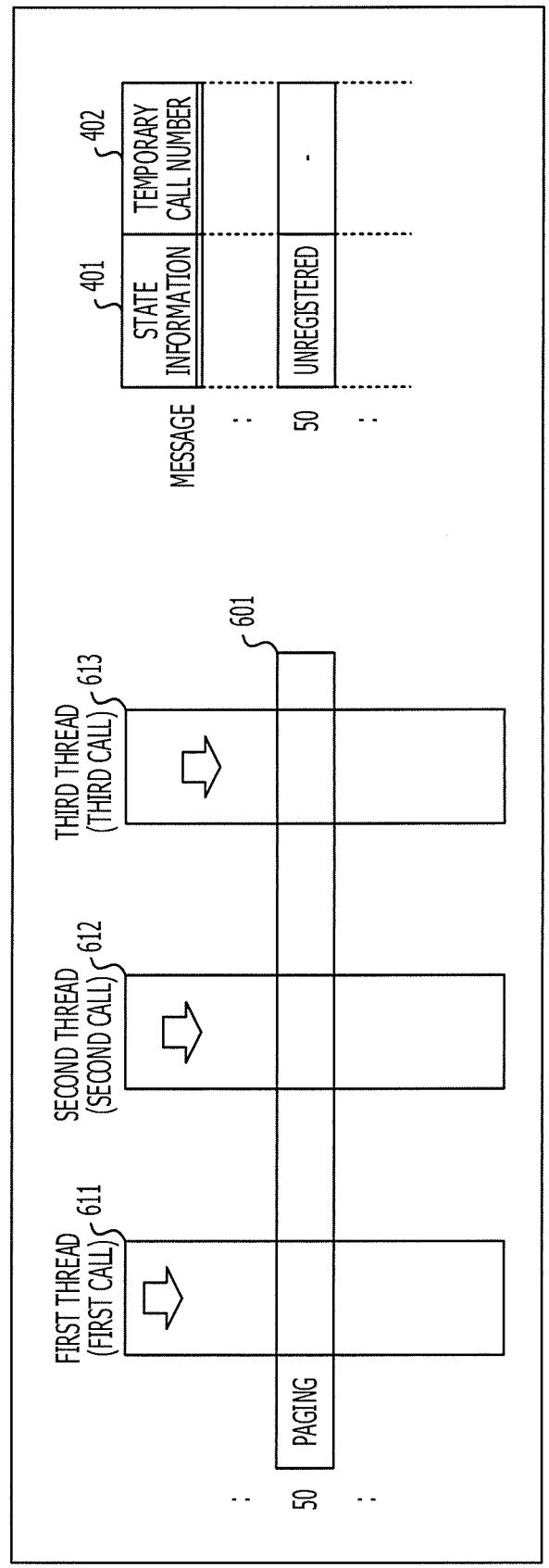
FIG. 6A illustrates a first example of a process by an executing unit.

FIG. 6A illustrates a state in which the first thread 611, the second thread 612, and the third thread 613 are starting. The initial value of the state information 401 corresponding to the paging message 601 is "unregistered" when the first thread 611, the second thread 612, and the third thread 613 are starting. The temporary call number 402 corresponding to the paging message 601 has not been registered.

Figure 6B:
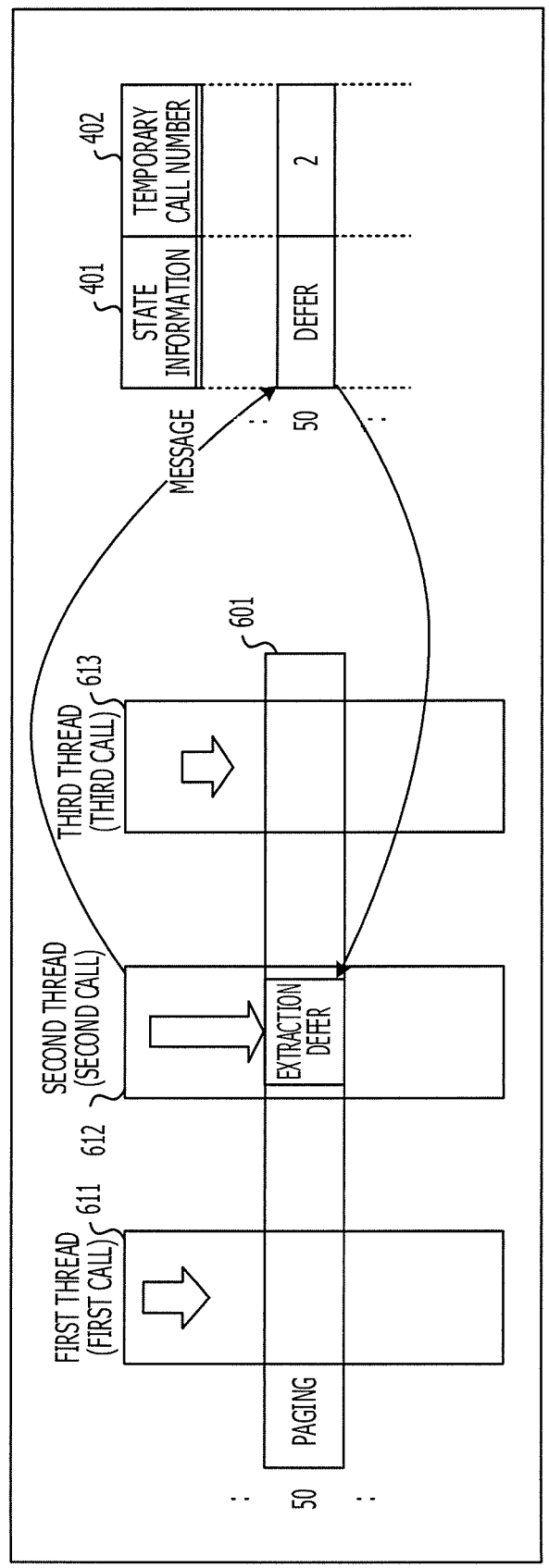
FIG. 6B illustrates a second example of a process by an executing unit.

FIG. 6B illustrates a state in which the processes of the first thread 611, the second thread 612, and the third thread 613 advance and the second thread 612 reaches the processing of the paging message 601 first. The second thread executing unit 132 determines that the paging message 601 is a candidate message since the TMSI of the terminal being called by the second call is included in the paging message 601.

In this case, the second thread executing unit 132 changes the state information 401 corresponding to the paging message 601 to "defer" since the state information 401 corresponding to the paging message 601 is "unregistered." The second thread executing unit 132 then registers the call number "2" of the second call to be extracted as the temporary call number 402 corresponding to the paging message 601. The second thread executing unit 132 defers (extraction defer) the extraction of the paging message 601.

Figure 6C:
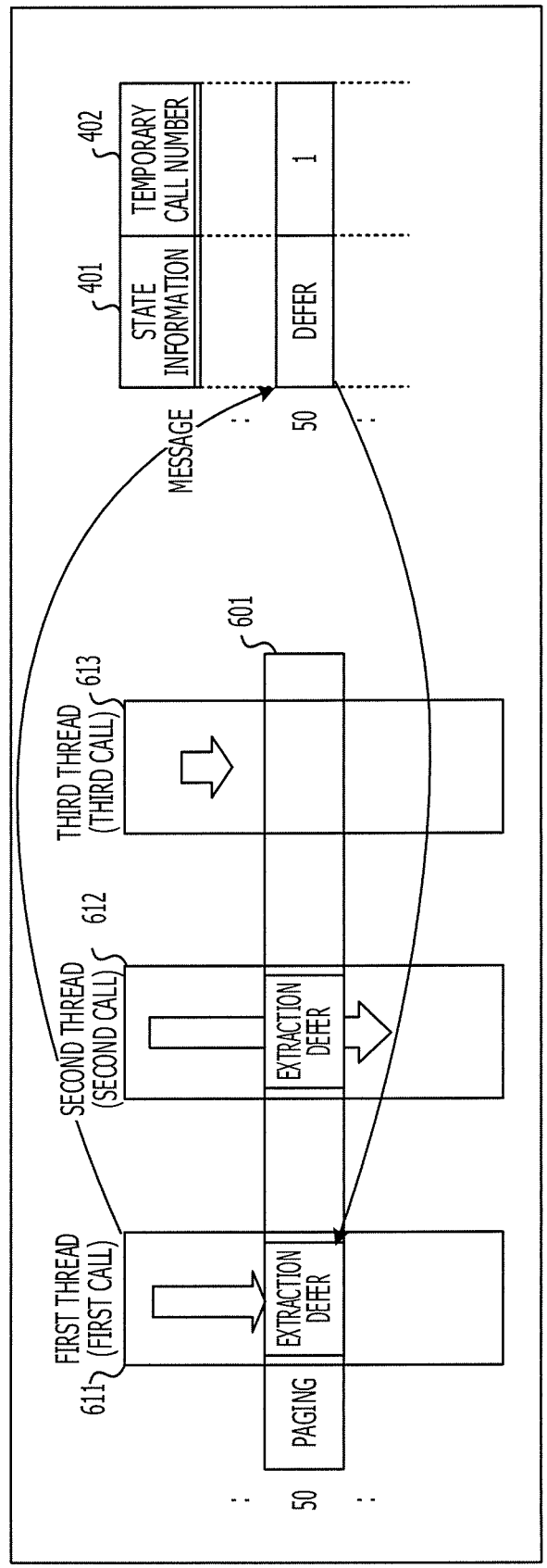
FIG. 6C illustrates a third example of a process by an executing unit.

FIG. 6C illustrates a state in which the processes of the first thread 611, the second thread 612, and the third thread 613 advance further and the first thread 611 reaches the processing of the paging message 601. The first thread executing unit 131 determines that the paging message 601 is a candidate message since the TMSI of the terminal being called by the first call is included in the paging message 601.

In this case, the first thread executing unit 131 compares the temporary call number 402 ("2") corresponding to the paging message 601 with the call number "1" of the first call to be extracted since the state information 401 corresponding to the paging message 601 is "defer." The first thread executing unit 131 then changes the temporary call number 402 corresponding to the paging message 601 to "1" since the call number "1" of the first call to be extracted is earlier in the order than the temporary call number 402 ("2") corresponding to the paging message 601. The first thread executing unit 131 defers (extraction defer) the extraction of the paging message 601.

Figure 6D:
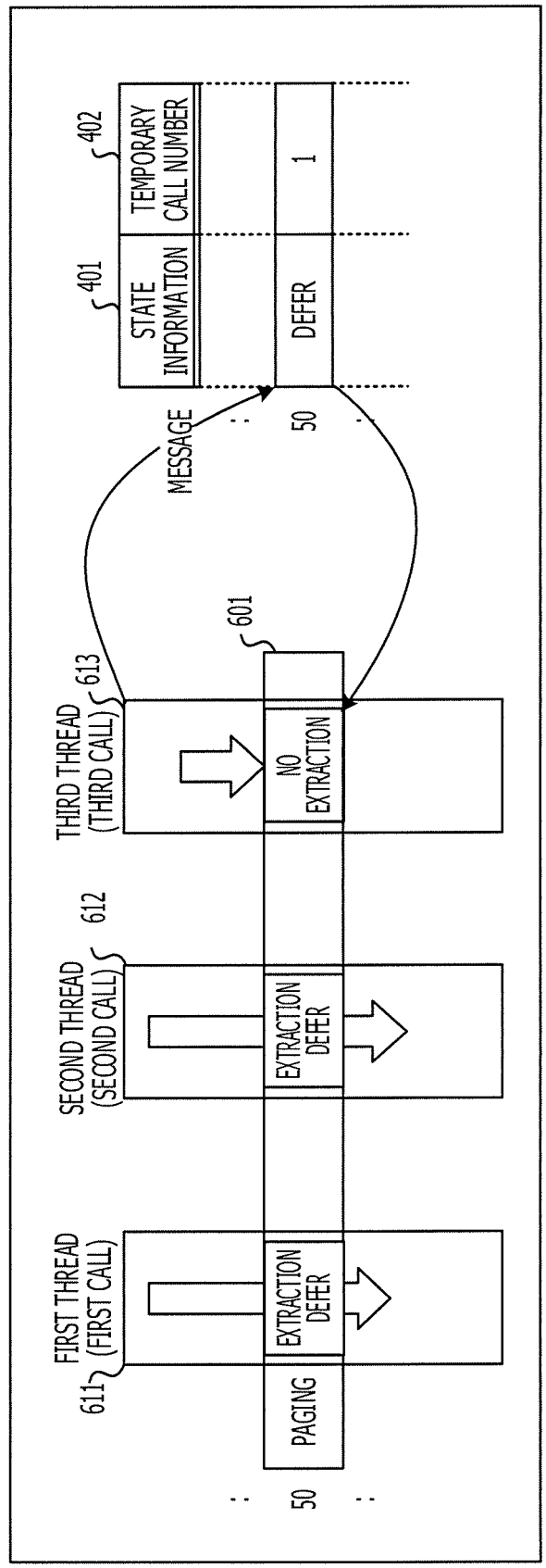
FIG. 6D illustrates a fourth example of a process by an executing unit.

FIG. 6D illustrates a state in which the processes of the first thread 611, the second thread 612, and the third thread 613 advance further and the third thread 613 reaches the processing of the paging message 601. The third thread executing unit 133 determines that the paging message 601 is a candidate message since the TMSI of the terminal being called by the third call is included in the paging message 601.

In this case, the third thread executing unit 133 compares the temporary call number 402 ("1") corresponding to the paging message 601 with the call number "3" of the third call to be extracted since the state information 401 corresponding to the paging message 601 is "defer." The third thread executing unit 133 then does not change the temporary call number 402 corresponding to the paging message 601 since the call number "3" of the third call to be extracted is later in the order than the temporary call number 402 ("1") corresponding to the paging message 601. The third thread executing unit 133 does not extract (no extraction) the paging message 601.

Figure 6E:
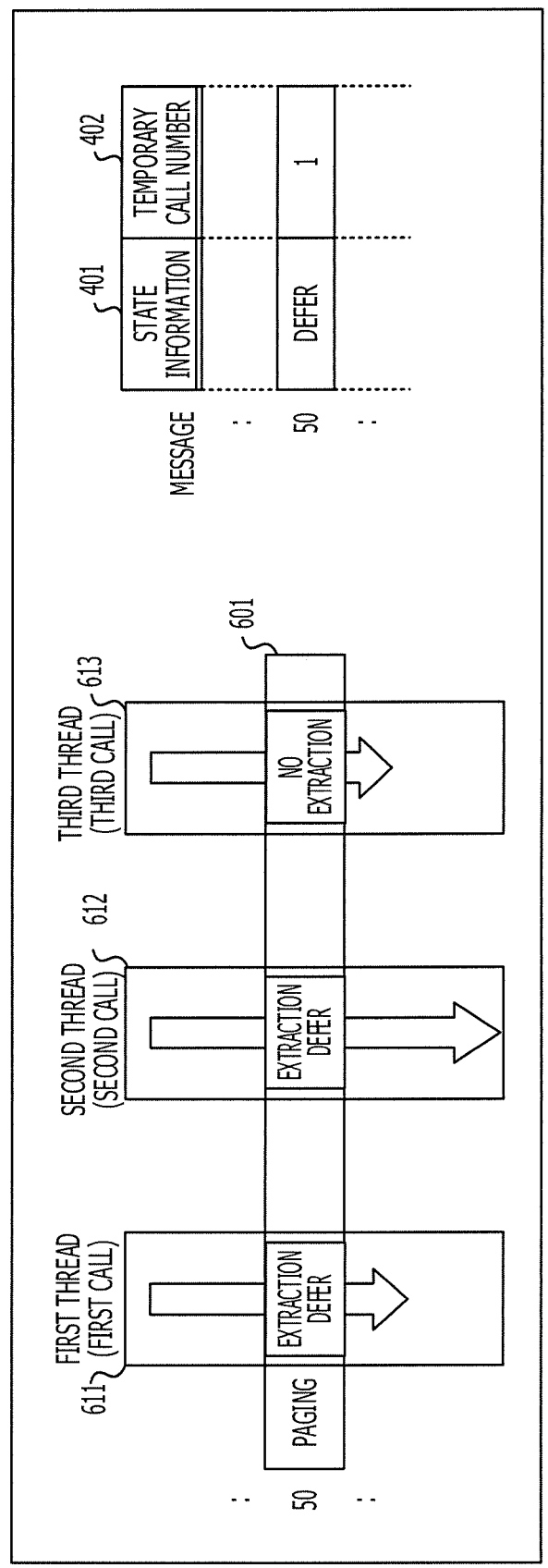
FIG. 6E illustrates a fifth example of a process by an executing unit.

FIG. 6E illustrates a state in which the processes of the first thread 611, the second thread 612, and the third thread 613 advance further and the first process is completed due to the second thread 612 reaching the last message in the log 300 or the last message of the second call. In this case, the second thread executing unit 132 waits until the first process is completed by the first thread executing unit 131 and the third thread executing unit 133.

FIG. 6F illustrates a state in which the processes of the first thread 611 and the third thread 613 advance further and the first process is completed by the first thread 611 and the third thread 613. In this case, the first thread executing unit 131 and the second thread executing unit 132 that deferred the extraction of the paging message 601 refer to the temporary call number 402 corresponding to the paging message 601.

The first thread executing unit 131 extracts the paging message 601 as the message of the first call since the temporary call number 402 corresponding to the paging message 601 is the call number "1" of the first call to be extracted. The first thread executing unit 131 changes the state information 401 corresponding to the paging message 601 to "extracted."

The second thread executing unit 132 does not extract the paging message 601 as the message of the second call since the temporary call number 402 corresponding to the paging message 601 is not the call number "2" of the second call to be extracted.

As a result, even though the second thread 612 reaches the processing of the paging message 601 before the first thread 611, the paging message 601 that is a message of the first call may be extracted in the first thread 611. In this way, the extraction of the paging message 601 may be delayed until the call to be originally extracted is found due to the management of the paging message 601 with the three states of "unregistered," "defer," and "extracted."

Figure 6G:
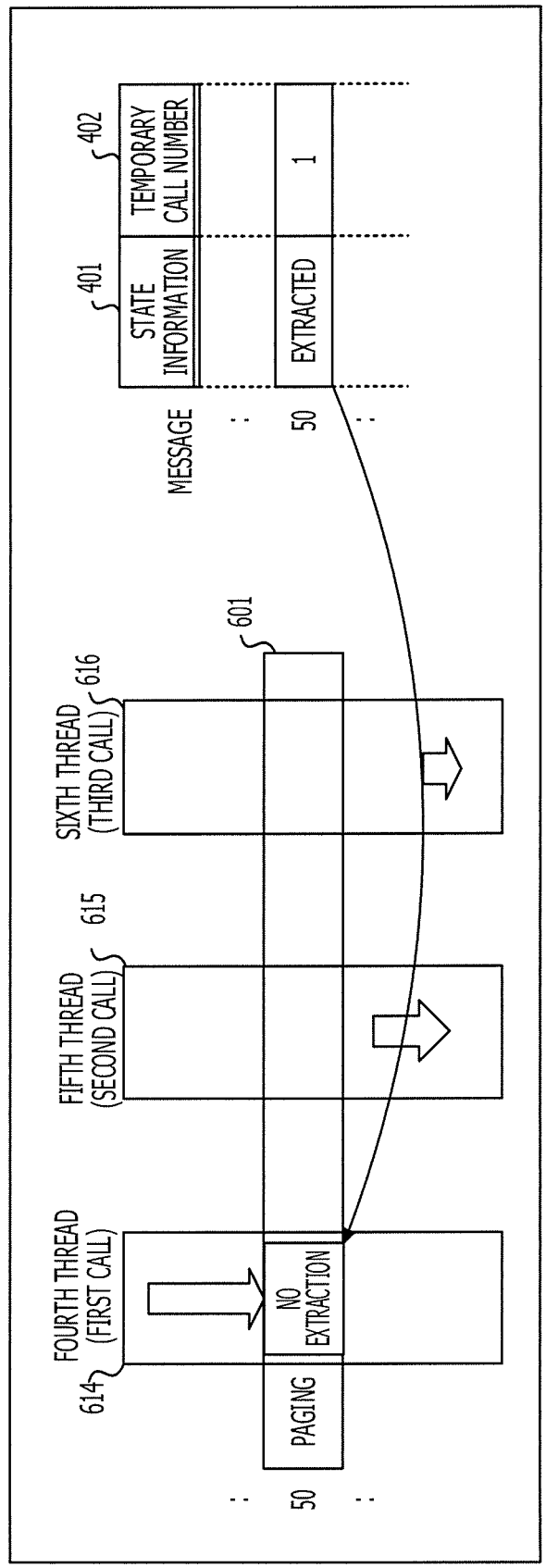
FIG. 6G illustrates a seventh example of a process by an executing unit.

FIG. 6G illustrates a state in which the thread management unit 130 creates a fourth thread 614, a fifth thread 615, and a sixth thread 616 for respectively extracting a fourth call, a fifth call, and a sixth call to be extracted next when the extractions of the first call, the second call, and the third call are completed. Since the state information 401 of the paging message 601 is "extracted," the paging message 601 is not subject to extraction in the fourth thread 614, the fifth thread 615, or the sixth thread 616.

(Thread Processing)

Figure 7A:
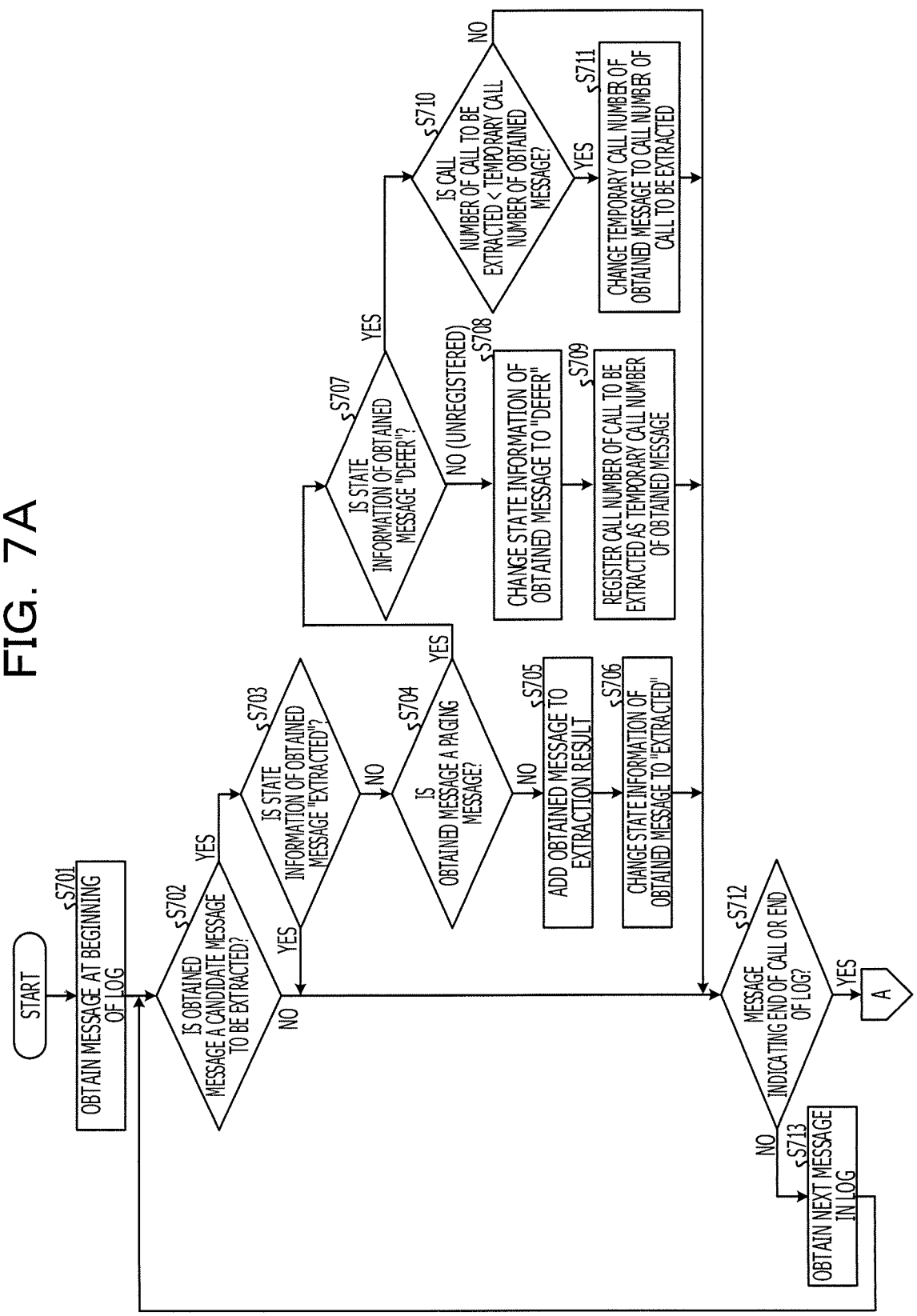
FIG. 7A is a first flow chart illustrating an example of thread processing.
Figure 7B:
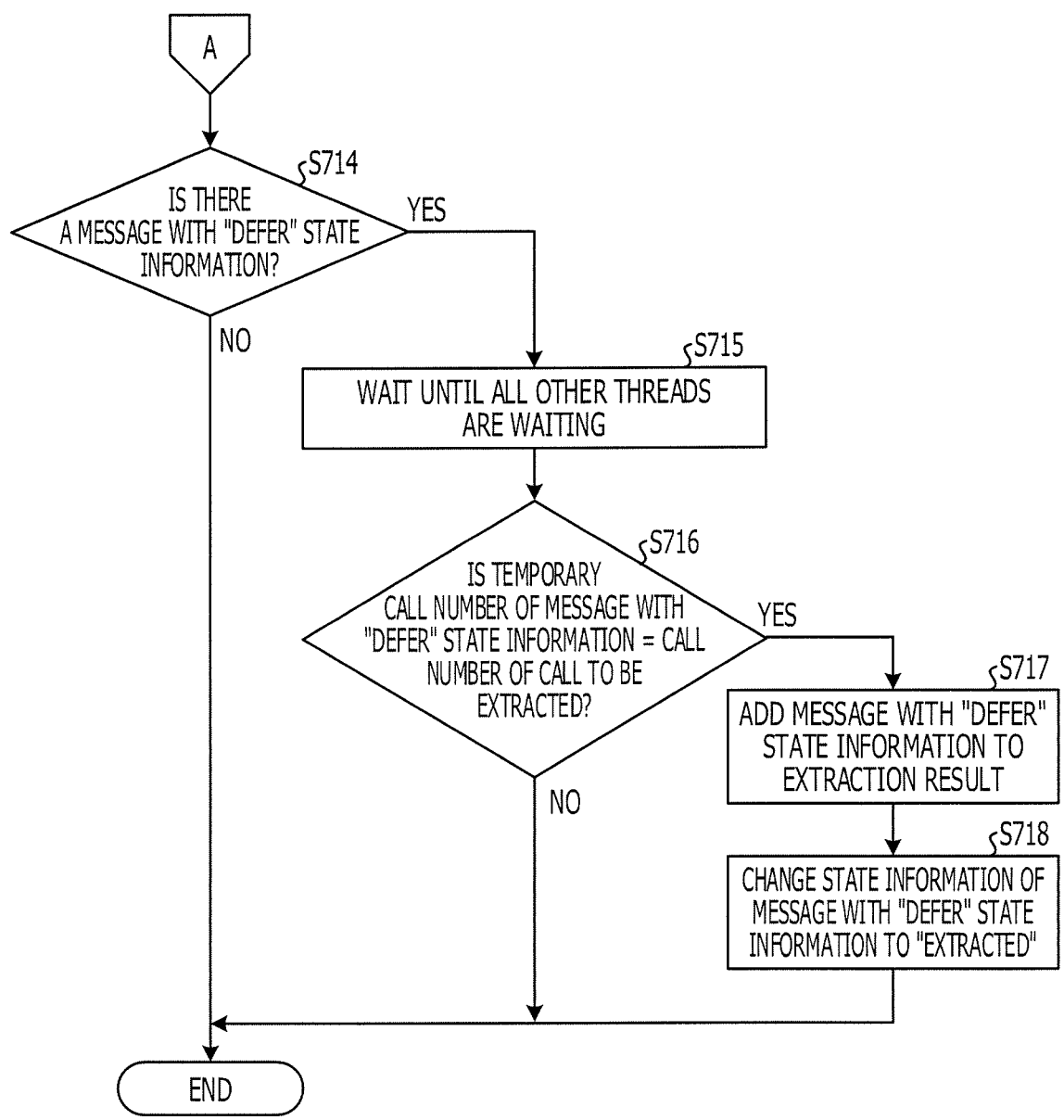
FIG. 7B is a second flow chart illustrating an example of thread processing.

FIGS. 7A and 7B are flow charts illustrating an example of processing of the threads. The first thread executing unit 131 executes, for example, the steps illustrated in FIGS. 7A and 7B as processing of the first thread. While FIGS. 7A and 7B describe processing of the first thread by the first thread executing unit 131, the processing of the second thread by the second thread executing unit 132 and the processing of third thread by the third thread executing unit 133 are similar.

(First Process)

Firstly, the first thread executing unit 131 executes steps S701 to S710 illustrated in FIG. 7A as the first process. That is, the first thread executing unit 131 obtains a message at the beginning of the log 300 (step S701). Next, the first thread executing unit 131 determines whether the obtained message is a candidate message to be extracted (step S702).

The obtained message in step S702 is a message obtained in the previous step of either step S701 or step S713. The candidate message to be extracted is a message that satisfies a certain condition based on a call to be extracted. The determination of whether the obtained message is a candidate message to be extracted is described below (see, for example, FIG. 8).

If, in step S702, the obtained message is the candidate message to be extracted (step S702: Yes), the first thread executing unit 131 determines whether the state information 401 of the obtained message is "extracted" (step S703). If the state information 401 is "extracted" (step S703: Yes), the first thread executing unit 131 does not extract the obtained message and then proceeds to step S712.

If, in step S703, the state information 401 is not "extracted" (step S703: No), the first thread executing unit 131 determines whether the obtained message is a paging message (step S704). If the obtained message is not a paging message (step S704: No), the first thread executing unit 131 adds the obtained message to the extraction result (step S705). The first thread executing unit 131 changes the state information 401 of the obtained message to "extracted" (step S706) and then proceeds to step S712.

If, in step S704, the obtained message is a paging message (step S704: Yes), the first thread executing unit 131 determines whether the state information 401 of the obtained message is "defer" (step S707). If the state information 401 is "unregistered" and not "defer" (step S707: No), the first thread executing unit 131 changes the state information 401 of the obtained message to "defer" (step S708). The first thread executing unit 131 registers the call number "1" of the call to be extracted as the temporary call number 402 of the obtained message (step S709) and then proceeds to step S712.

If, in step S707, the state information 401 is "defer" (step S707: Yes), the first thread executing unit 131 determines whether the call number "1" of the call to be extracted is smaller than the temporary call number 402 of the obtained message (step S710). If the call number "1" of the call to be extracted is smaller than the temporary call number 402 of the obtained message (step S710: Yes), the first thread executing unit 131 changes the temporary call number 402 of the obtained message to the call number "1" of the call to be extracted (step S711), and then proceeds to step S712.

If, in step S710, the call number "1" of the call to be extracted is not smaller than the temporary call number 402 of the obtained message (step S710: No), the first thread executing unit 131 does not change the temporary call number 402 of the obtained message and then proceeds to step S712.

If, in step S702, the obtained message is not the candidate message to be extracted (step S702: No), the first thread executing unit 131 proceeds to step S712. That is, the first thread executing unit 131 determines whether the obtained message is a message indicating the end of the call to be extracted or is the end of the log 300 (step S712). If the obtained message is neither the message indicating the end of the call to be extracted nor the end of the log 300 (step S712: No), the first thread executing unit 131 obtains the next message in the log 300 (step S713) and returns to step S702.

If, in step S712, the obtained message is the message indicating the end of the call to be extracted or the end of the log 300 (step S712: Yes), the first thread executing unit 131 completes the first process (symbol A) and executes steps S714 to S718 illustrated in FIG. 7B as the second process.

(Second Process)

That is, the first thread executing unit 131 determines whether any messages indicate "defer" under the state information 401 in the log 300 (step S714). If there is no message indicating "defer" under the state information 401 (step S714: No), the first thread executing unit 131 completes the series of processes.

If, in step S714, there is a message indicating "defer" (step S714: Yes), the first thread executing unit 131 waits until the other threads are waiting (step S715). As a result, the completion of the first process is made to wait due to the other threads.

Next, the first thread executing unit 131 determines whether the temporary call number 402 of the "defer" message is the same as the call number "1" of the call to be extracted (step S716). If the message is not the same (step S716: No), the first thread executing unit 131 does not extract the "defer" message and the series of processes is completed.

If, in step S716, the message is the same (step S716: Yes), the first thread executing unit 131 adds the message with "defer" to the extraction result (step S717). The first thread executing unit 131 changes the state information 401 of the message with "defer" to "extracted" (step S718) and the series of processes is completed.

If a plurality of messages in which the state information is "defer" are present in the log 300, the first thread executing unit 131 may execute the processing in steps S715 to S718 on each of the plurality of messages in which the state information is "defer" in the log 300.

In this way, due to the process to change the call number in step S711, only the order information most recently stored in the storage unit 140 remains in the storage unit 140. As a result, due to the determination in step S716 that the temporary call number 402 of the message with "defer" is the same as that of the call number to be extracted, a decision may be made as to whether or not the order information that indicates an order earlier than the order information of the call to be extracted is stored in the storage unit 140.

However, a process to add and store the call number may be executed in step S711. In this case, for example, a decision may be made as to whether or not a call number indicating an order earlier than the call number to be extracted is stored in the storage unit 140 as the temporary call number 402 of the message with "defer".

A process of adding and storing the call number may be executed in steps S710 and S711 regardless of whether the call number to be extracted is smaller than the temporary call number 402 of the obtained message. In this case, for example, a decision may be made as to whether or not a call number earlier in the order than the call number to be extracted is stored in the storage unit 140 as the temporary call number 402 of the message with "defer".

The first thread executing unit 131 stores the state information 401 indicated as "defer" (certain information) in the storage unit 140 in association with the candidate message that is determined to be the paging message in the first process. As a result, the first thread executing unit 131 is able to specify the candidate message determined to be the paging message based on the state information 401 indicated as "defer" stored in the storage unit 140 in the second process.

(Processing to Determine Whether Candidate Message is to be Extracted)

Figure 8:
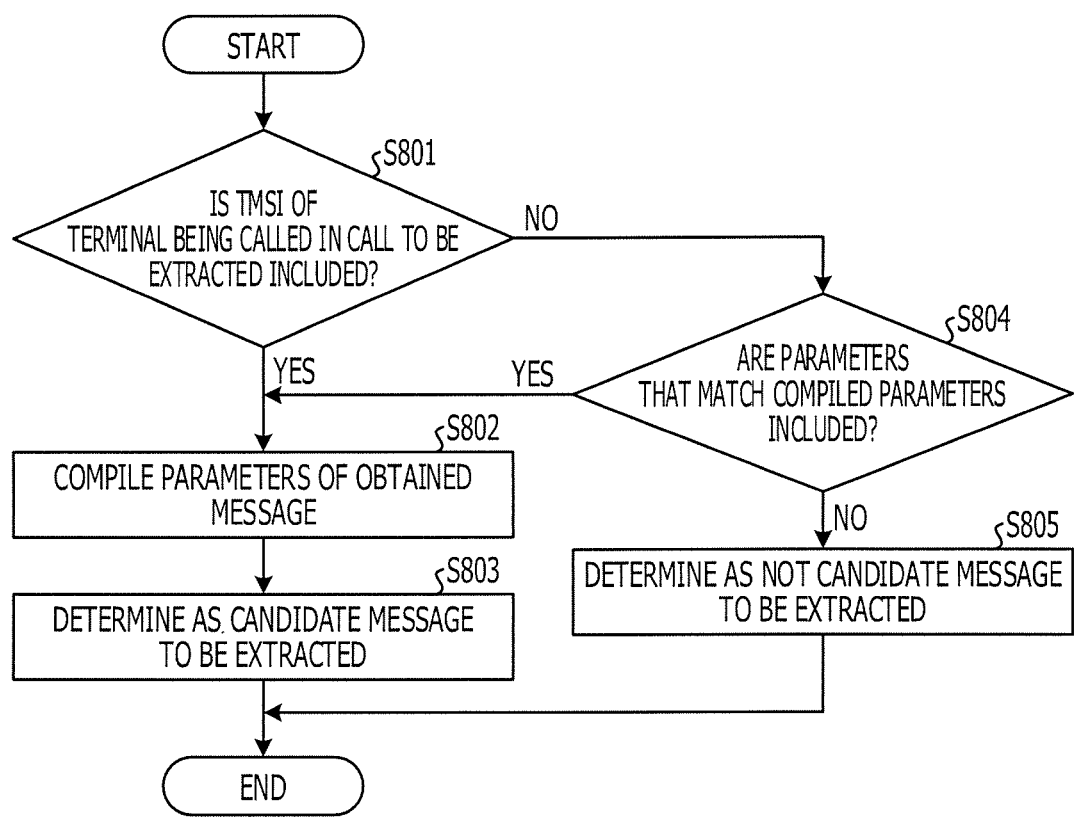
FIG. 8 is a flow chart illustrating an example of a determination processing for determining whether a candidate message is to be extracted.

FIG. 8 is a flow chart illustrating an example of a determination processing for determining whether a candidate message is to be extracted. In step S702 in FIG. 7A, the first thread executing unit 131 follows, for example, the steps illustrated in FIG. 8 to determine whether the obtained message is a candidate message to be extracted. First, the first thread executing unit 131 determines whether the obtained message includes the TMSI of the terminal being called in the call to be extracted (step S801).

If, in step S801, the TMSI of the terminal being called is included (step S801: Yes), the first thread executing unit 131 compiles the parameters of the obtained message (step S802). An area for compiling the parameters may be, for example, a specific region in the storage unit 140. The first thread executing unit 131 determines that the obtained message is a candidate message to be extracted (step S803), and the series of determination processes is completed.

If, in step S801, the TMSI of the terminal being called is not included (step S801: No), the first thread executing unit 131 determines whether the obtained message includes parameters that match the compiled parameters (step S804). If the obtained message includes parameters that match the compiled parameters (step S804: Yes), the first thread executing unit 131 advances to step S802.

If, in step S804, no parameters that match the compiled parameters are included (step S804: No), the first thread executing unit 131 determines that the obtained message is not a candidate message to be extracted (step S805), and the series of determination processes is completed.

In this way, parameters in the obtained messages are compiled as data since the parameters in each message are unique to each call, and a message of the same call may be determined if a parameter matches any of the compiled parameters.

(Example of Candidate Message Determination)

Hereinbelow is provided an explanation when the first thread executing unit 131 makes a determination about a candidate message of the first call to be extracted regarding an example of the parameters and the log 300 illustrated in FIG. 3B. The TMSI of the terminal being called in the first call is assumed to be "10."

Firstly, the first thread executing unit 131 compiles TMSI=10. The first thread executing unit 131 then extracts the message (1) at the beginning of the calls that includes the TMSI "10." The first thread executing unit 131 then compiles TMSI=10 and para1=5 that are the parameters included in the extracted message (1). Since TMSI=10 has already been compiled, TMSI=10 does not have to be compiled again.

Next, the first thread executing unit 131 refers to the order of the messages following the message (1) and determines that a message that includes a parameter that is the same as the compiled parameters is a candidate message.

In the example illustrated in FIG. 3B, since the message (2) includes the compiled para1=5, the first thread executing unit 131 determines that the message (2) is a candidate message and compiles para1=5 and para2=20 that are the parameters include in the message (2). Since para1=5 has already been compiled, para1=5 does not have to be compiled again.

Next, since the message (3) does not include a compiled parameter, the first thread executing unit 131 determines that the message (3) is not a candidate message. Next, since the message (4) does not include a compiled parameter, the first thread executing unit 131 determines that the message (4) is not a candidate message.

Next, since the message (5) includes the compiled para2=20, the first thread executing unit 131 determines that the message (5) is a candidate message and compiles para 2=20 that is the parameter include in the message (5). Since para2=20 has already been compiled, para2=20 does not have to be compiled again.

Next, since the message (6) includes the compiled TMSI=10, the first thread executing unit 131 determines that the message (6) is a candidate message and compiles TMSI=10 and para3=30 that are the parameters included in the message (6). Since TMSI=10 has already been compiled, TMSI=10 does not have to be compiled again.

Next, since the message (7) does not include a compiled parameter, the first thread executing unit 131 determines that the message (7) is not a candidate message.

Next, since the message (8) includes the compiled para3=30, the first thread executing unit 131 determines that the message (8) is a candidate message and compiles para3=30 that is the parameter included in the message (8). Since para3=30 has already been compiled, para3=30 does not have to be compiled again.

(Communication System Able to Use Data Extraction Device)

Figure 9:
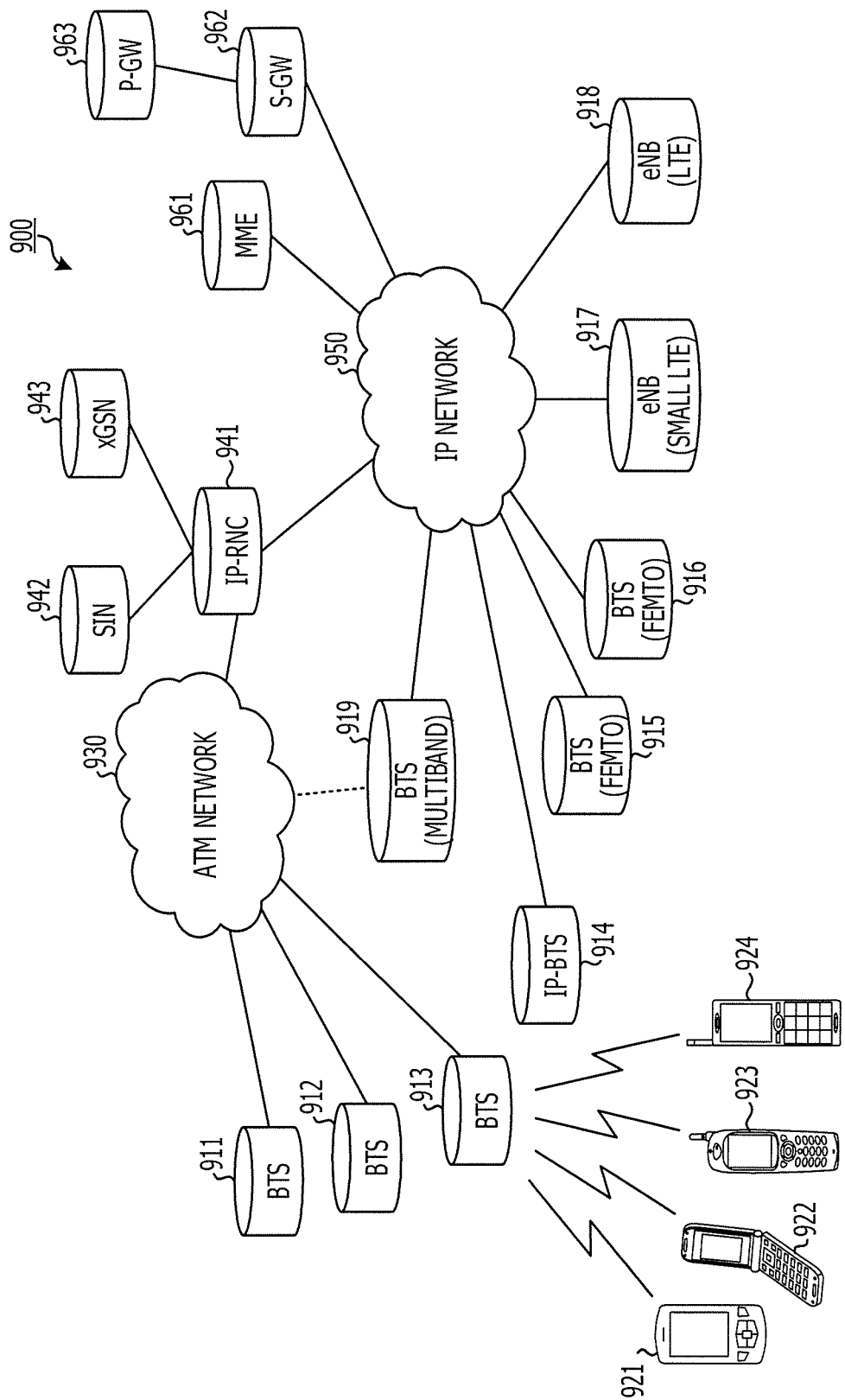
FIG. 9 illustrates an example of a communication system in which the data extraction device may be used.

FIG. 9 illustrates an example of a communication system in which the data extraction device may be used. A communication system 900 illustrated in FIG. 9 is a communication system that includes both wideband-code division multiple access (WDMA) and long term evolution (LTE).

The communication system 900 includes base stations 911 to 919, wireless terminals 921 to 924, an ATM network 930, an IP-RNC 941, a SIN 942, a xGSN 943, an IP network 950, a MME 961, a S-GW 962, and a P-GW 963.

The base stations 911 to 919 are base stations that conduct wireless communication with the wireless terminals. The base stations 911 to 913 are base transceiver stations (BTS). The base station 914 is an IP-BTS. The base stations 915 and 916 are femto base stations. The base stations 917 and 918 are evolved node B (eNB) base stations. The base station 919 is a multiband BTS. For example, the wireless terminals 921 to 924 conduct wireless communication with the base station 913.

The base stations 911 to 913 are connected to the asynchronous transfer mode (ATM) network 930. The ATM network 930 is connected to the IP network 950 through the IP-RNC 941.

The signaling interworking node for 3G access (SIN) 942 and the serving/gateway general packet radio service support node (xGNS) 943 are connected to the IP-RNC 941.

The base stations 914 to 919 are connected directly to the IP network 950. The base station 919 may be connected to the ATM network 930.

The mobility management entity (MME) 961 and the serving gateway (S-GW) 962 are connected to the IP network 950. The packet data network gateway (P-GW) 963 is connected to the S-GW 962.

The data extraction device 100 according to the embodiment, for example, is able to be applied to the IP-RNC 941 or to a computer connected to the IP-RNC 941. As a result, logs of call control messages that pass through the IP-RNC 941 may be obtained. Moreover, the data extraction device 100 may be applicable to either of the base stations 917 and 918, or a computer connected to either of the base stations 917 and 918. As a result, logs of call control messages that pass through the either of the base stations 917 and 918 may be obtained.

In this way, the data extraction device 100 is able to, for example, obtain logs of signals (messages) passing through the IP-RNC 941 that conducts call control, or through the base stations 917 and 918, and is able to extract specific call messages from the obtained logs. As a result, the analysis of call loss or damage and the like may be aided.

As described above, according to the data extraction method, the data extraction program, and the data extraction device, the time desired for the processing to extract a plurality of call control messages from a log may be reduced.

The data extraction method described in the present embodiment may be realized by executing a program prepared in advance using a computer such as a personal computer or a workstation. Furthermore, the data extraction program may be recorded on a hard disk, a flexible disk, a CD-ROM, a MO, a DVD or another type of computer-readable recording medium so that the data extraction program may be executed by being read from the recording medium by the computer. The data extraction program may also be distributed through a communication network such as the internet and the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A data extraction method, comprising:
  obtaining a log in which control messages for a plurality of calls are mixed; and
  executing, by a processor, in parallel a plurality of extraction processes each extracting a control message for a different call to be extracted from the log,
  the plurality of extraction processes each including:
  a first process that includes:
    determining whether a candidate message that satisfies a certain condition based on the call to be extracted among the control messages is a paging message; and
    storing order information for specifying an order of the call to be extracted among the plurality of calls, when determined that the candidate message is a paging message; and
  a second process that includes:
    determining, after the first process on the plurality of extraction processes has been completed, whether the candidate message determined to be the paging message is the control message of the call to be extracted, based on the order information.

2. The data extraction method according to claim 1, wherein the order information is stored in a storage that is accessible to the plurality of extraction processes.

3. The data extraction method according to claim 1, wherein the first process includes:
  determining that the candidate message is a control message of the call to be extracted when determined that the candidate message is not the paging message.

4. The data extraction method according to claim 1, wherein the second process includes:
  determining that the candidate message determined to be the paging message is the control message of the call to be extracted, when order information indicating an order earlier than the order information of the call to be extracted is not stored; and
  determining that the candidate message determined to be the paging message is not the control message of the call to be extracted, when the order information indicating an order earlier is stored.

5. The data extraction method according to claim 1, wherein
  the first process includes:
    storing the order information when the order information indicating an order earlier than the order information of the call to be extracted is not stored; and
    not storing the order information when the order information indicating an order earlier is stored; and
  the second process includes:
    determining that the candidate message determined to be the paging message is the control message of the call to be extracted, when the order information stored last is the order information of the call to be extracted; and
    determining that the candidate message determined to be the paging message is not the control message of the call to be extracted, when the order information stored last is not the order information of the call to be extracted.

6. The data extraction method according to claim 1, wherein
  the first process includes
    storing certain information associated with the candidate message determined to be the paging message, when the candidate message is determined to be the paging message; and
  the second process includes:
    specifying the candidate message determined to be the paging message based on the certain information; and
    determining whether the specified candidate message is the control message of the call to be extracted.

7. The data extraction method according to claim 1, wherein
  the certain condition includes at least one of:
    identification information of a terminal being called in the call to be extracted; and a parameter that is the same as that of the control message determined to satisfy the certain condition.

8. The data extraction method according to claim 1, wherein each of the plurality of extraction processes is a thread; and
a process for executing in parallel the plurality of extraction processes is a parallel process by multi-threading.

9. The data extraction method according to claim 1, wherein
the log is a log of control messages for a plurality of calls via a given communication device in a mobile communication network.

10. A data extraction device, comprising:
a memory; and
a processor coupled to the memory and configured to:
obtain a log in which control messages for a plurality of calls are mixed, and
execute in parallel a plurality of extraction processes each extracting a control message for a different call to be extracted from the log,
the plurality of extraction processes including:
a first process that includes:
determining whether a candidate message that satisfies a certain condition based on the call to be extracted among the control messages is a paging message; and
storing order information for specifying an order of the call to be extracted among the plurality of calls, when determined that the candidate message is a paging message; and
a second process that includes:
determining, after the first process on the plurality of extraction processes has been completed, whether the candidate message determined to be the paging message is the control message of the call to be extracted, based on the order information.

11. The data extraction device according to claim 10, wherein the order information is stored in a storage that is accessible to the plurality of extraction processes.

12. The data extraction device according to claim 10, wherein the first process includes:
determining that the candidate message is a control message of the call to be extracted when determined that the candidate message is not the paging message.

13. A communication system comprising:
a communication device configured to perform at least one of call control for a wireless terminal and wireless communication with a wireless terminal; and
a data extraction device configured to:
obtain a log in which control messages for a plurality of calls via the communication device are mixed, and
execute in parallel a plurality of extraction processes each extracting a control message for a different call to be extracted from the log, the plurality of extraction processes including:
a first process that includes:
determining whether a candidate message that satisfies a certain condition based on the call to be extracted among the control messages is a paging message; and
storing order information for specifying an order of the call to be extracted among the plurality of calls, when determined that the candidate message is a paging message; and
a second process that includes:
determining, after the first process on the plurality of extraction processes has been completed, whether the candidate message determined to be the paging message is the control message of the call to be extracted, based on the order information.

14. The communication system according to claim 13, wherein the communication device includes the data extraction device.

15. The data extraction method according to claim 13, wherein
the certain condition includes at least one of:
identification information of the wireless terminal being called in the call to be extracted; and
a parameter that is the same as that of the control message determined to satisfy the certain condition.

* * * * *